US011954693B2

(12) United States Patent
Martinez Morales et al.

(10) Patent No.: US 11,954,693 B2
(45) Date of Patent: Apr. 9, 2024

(54) DYNAMIC TEST SUITE CREATION USING EVENT COMMUNICATIONS FROM CUSTOMERS

(71) Applicant: Lenovo Global Technology (United States) Inc., Morrisville, NC (US)

(72) Inventors: Paola Martinez Morales, Wendell, NC (US); Eric R. Kern, Chapel Hill, NC (US); Robert Furda, Bratislava (SK); Asmaa El Andaloussi, Asnieres-sur-Seine (FR); Firoz Rangwalla, Suwanee, GA (US); Brian E. Finley, Allen, TX (US)

(73) Assignee: Lenovo Global Technology (United States) Inc., Morrisville, NC (US)

( * ) Notice: Subject to any disclaimer, the term of this patent is extended or adjusted under 35 U.S.C. 154(b) by 180 days.

(21) Appl. No.: 17/686,228

(22) Filed: Mar. 3, 2022

(65) Prior Publication Data
US 2023/0281637 A1 Sep. 7, 2023

(51) Int. Cl.
*G06Q 30/00* (2023.01)
*G06N 20/00* (2019.01)
*G06Q 30/016* (2023.01)

(52) U.S. Cl.
CPC ........... *G06Q 30/016* (2013.01); *G06N 20/00* (2019.01)

(58) Field of Classification Search
None
See application file for complete search history.

(56) References Cited

U.S. PATENT DOCUMENTS

| 6,301,666 | B1 * | 10/2001 | Rive | G06F 9/468 |
| | | | | 707/999.009 |
| 2002/0068607 | A1 * | 6/2002 | Altschul | H04M 1/72403 |
| | | | | 455/411 |
| 2006/0048025 | A1 * | 3/2006 | Filipovic | G07C 3/005 |
| | | | | 714/724 |

(Continued)

OTHER PUBLICATIONS

Santiago, "AI-Driven Test Generation: Machines Learning from Human Testers", PNSQC, Sep. 2018, pp. 1-14.

(Continued)

*Primary Examiner* — Matthew T Sittner
(74) *Attorney, Agent, or Firm* — Kunzler Bean & Adamson; Bruce R. Needham (57) ABSTRACT

A method for dynamic test suite creation from event communications from customers includes receiving an event communication from a customer about an adverse event. The customer receives support for computing equipment over a management network from a support provider and the adverse event is regarding the computing equipment. The method includes analyzing the event communication using natural language processing to identify a potential cause of the adverse event and selecting one or more tests from a test library based on the identified potential cause of the adverse event. Each test of the tests is configured to test a portion of the computing equipment to lead to identification of a cause of the adverse event. The method includes automatically initiating the selected one or more tests through the management network and analyzing test results from execution of the selected one or more tests to identify a cause the adverse event.

15 Claims, 5 Drawing Sheets

(56) References Cited

U.S. PATENT DOCUMENTS

| | | | | |
|---|---|---|---|---|
| 2013/0173479 A1* | 7/2013 | Paz Salgado | ........ | G06Q 30/016 |
| | | | | 705/304 |
| 2017/0063912 A1* | 3/2017 | Muddu | ................ | G06V 10/225 |
| 2018/0103004 A1* | 4/2018 | Demir | .................... | H04L 51/52 |
| 2018/0260268 A1* | 9/2018 | Madsen | .............. | G06F 11/0727 |
| 2019/0278646 A1* | 9/2019 | Fernandez | ............ | G06F 11/079 |
| 2020/0175439 A1* | 6/2020 | Abu El Ata | ....... | G06Q 10/0635 |
| 2020/0273573 A1* | 8/2020 | Perera | .................... | G16H 50/20 |

OTHER PUBLICATIONS

Murray, "Hierarchical Test Generation Using Precomputed Tests for Modules", IEEE vol. 9 No. 6, Jun. 1990, pp. 694-603.

IBM, "Accelerate analytics and application development", IBM InfoSphere Virtual Data Pipeline, pp. 1-7.

* cited by examiner

DYNAMIC TEST SUITE CREATION USING EVENT COMMUNICATIONS FROM CUSTOMERS

FIELD

The subject matter disclosed herein relates to computing system testing and more particularly relates to dynamic test suite creation from event communications from customers.

BACKGROUND

Customers often use computing equipment for execution of workloads where the computing equipment is managed by a service provider. The service provider, in many instances, owns the computing equipment. Management of the computing equipment is often done using a management network connected to the computing equipment. The computing equipment may be located at customer location remote from the service provider/owner or at a location of the service provider/owner. When the computing equipment goes into production and services workloads, typically there are a series of random quality tests performed but typically there is no predefined logic on which tests run. Having no predefined logic results in having tests performed that do not coincide with the reality of what customers are experiencing.

BRIEF SUMMARY

A method for dynamic test suite creation from event communications from customers is disclosed. An apparatus and computer program product also perform the functions of the method. The method includes receiving, via a management system, an event communication from a customer about an adverse event. The customer receives support for computing equipment over a management network from a support provider and the adverse event is regarding the computing equipment. The method includes analyzing the event communication received from the customer using natural language processing to identify a potential cause of the adverse event. The potential cause is related to the computing equipment. The method includes selecting one or more tests from a test library based on the identified potential cause of the adverse event. Each test of the one or more tests is configured to test a portion of the computing equipment to lead to identification of a cause of the adverse event. The method includes automatically initiating the selected one or more tests through the management network and analyzing test results from execution of the selected one or more tests to identify a cause the adverse event.

An apparatus for dynamic test suite creation from event communications from customers includes a processor and non-transitory computer readable storage media storing code. The code is executable by the processor to perform operations that include receiving, via a management system, an event communication from a customer about an adverse event. The customer receives support for computing equipment over a management network from a support provider. The adverse event is regarding the computing equipment. The operations include analyzing the event communication received from the customer using natural language processing to identify a potential cause of the adverse event. The potential cause is related to the computing equipment and selecting one or more tests from a test library based on the identified potential cause of the adverse event. Each test of the one or more tests is configured to test a portion of the computing equipment to lead to identification of a cause of the adverse event. The operations include automatically initiating the selected one or more tests through the management network and analyzing test results from execution of the selected one or more tests to identify a cause the adverse event.

A program product for dynamic test suite creation from event communications from customers includes a non-transitory computer readable storage medium storing code. The code is configured to be executable by a processor to perform operations that include receiving, via a management system, an event communication from a customer about an adverse event. The customer receives support for computing equipment over a management network from a support provider and the adverse event is regarding the computing equipment. The operations include analyzing the event communication received from the customer using natural language processing to identify a potential cause of the adverse event. The potential cause is related to the computing equipment. The operations include selecting one or more tests from a test library based on the identified potential cause of the adverse event. Each test of the one or more tests is configured to test a portion of the computing equipment to lead to identification of a cause of the adverse event. The operations include automatically initiating the selected one or more tests through the management network and analyzing test results from execution of the selected one or more tests to identify a cause the adverse event.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices, in some embodiments, are tangible, non-transitory, and/or non-transmission.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be written in any combination of one or more programming languages including an object oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C.

A method for dynamic test suite creation from event communications from customers is disclosed. An apparatus and computer program product also perform the functions of the method. The method includes receiving, via a management system, an event communication from a customer about an adverse event. The customer receives support for computing equipment over a management network from a support provider and the adverse event is regarding the computing equipment. The method includes analyzing the event communication received from the customer using natural language processing to identify a potential cause of the adverse event. The potential cause is related to the computing equipment. The method includes selecting one or more tests from a test library based on the identified potential cause of the adverse event. Each test of the one or more tests is configured to test a portion of the computing equipment to lead to identification of a cause of the adverse event. The method includes automatically initiating the selected one or more tests through the management network and analyzing test results from execution of the selected one or more tests to identify a cause the adverse event.

In some embodiments, the method includes using a machine learning algorithm to correlate tests from the test library with adverse events from event communications. In other embodiments, the method includes training the machine learning algorithm using a plurality of event communications from one or more customers about adverse events, related identified potential causes of the adverse events from the event communications, configuration information about computing equipment of the one or more customers, selected tests for each identified potential cause, analysis from the test results, identified causes of the adverse events, and/or confirmed causes of the adverse events.

In other embodiments, each potential cause of an adverse event includes a default selection of tests, and the machine learning algorithm modifies the default selection of tests for one or more adverse events based on the training of the machine learning algorithm. In other embodiments, the machine learning algorithm updates the correlation between the tests from the test library and adverse events based on input from additional adverse events from event communications. In other embodiments, the machine learning algorithm correlates content of event communications of customers with adverse events and updates natural language processing of the event communications based on the correlation of the content of the event communications and the adverse events. In other embodiments, the machine learning algorithm correlates adverse events with potential causes of the adverse events and updates the natural learning processing used to analyze event communications based on the correlation of adverse events with the potential causes.

In some embodiments, the method includes automatically initiating a solution to an identified cause of the adverse event in response to identifying a cause of the adverse event from the test results. In other embodiments, the customer leases the computing equipment from the support provider and/or has a subscription for use of the computing equipment. In other embodiments, the computing equipment is at a customer location remote from a location of a server of the support provider and the support provider manages the computing equipment over the management network. The server of the support provider is a portion of the management system. In other embodiments, the event communication is received via an electronic message, a recorded phone call, and/or a recorded online meeting.

An apparatus for dynamic test suite creation from event communications from customers includes a processor and non-transitory computer readable storage media storing code. The code is executable by the processor to perform operations that include receiving, via a management system, an event communication from a customer about an adverse event. The customer receives support for computing equipment over a management network from a support provider. The adverse event is regarding the computing equipment. The operations include analyzing the event communication received from the customer using natural language processing to identify a potential cause of the adverse event. The potential is cause related to the computing equipment and selecting one or more tests from a test library based on the identified potential cause of the adverse event. Each test of the one or more tests is configured to test a portion of the computing equipment to lead to identification of a cause of the adverse event. The operations include automatically initiating the selected one or more tests through the management network and analyzing test results from execution of the selected one or more tests to identify a cause the adverse event.

In some embodiments, the operations include using a machine learning algorithm to correlate tests from the test library with adverse events from event communications. In other embodiments, the operations include training the machine learning algorithm using a plurality of event communications from one or more customers about adverse events, related identified potential causes of the adverse events from the event communications, configuration information about computing equipment of the one or more customers, selected tests for each identified potential cause, analysis from the test results, identified causes of the adverse events, and/or confirmed causes of the adverse events.

In other embodiments, each potential cause of an adverse event includes a default selection of tests, and the machine learning algorithm modifies the default selection of tests for one or more adverse events based on the training of the machine learning algorithm. In other embodiments, the machine learning algorithm updates the correlation between the tests from the test library and adverse events based on input from additional adverse events from event communications. In other embodiments, the machine learning algorithm further correlates content of event communications of customers with adverse events and updates natural language processing of the event communications based on the correlation of the content of the event communications and the adverse event, and/or adverse events with potential causes of the adverse events. In other embodiments, the operations further include automatically initiating a solution to an identified cause of the adverse event in response to identifying a cause of the adverse event from the test results.

A program product for dynamic test suite creation from event communications from customers includes a non-transitory computer readable storage medium storing code. The code is configured to be executable by a processor to perform operations that include receiving, via a management system, an event communication from a customer about an adverse event. The customer receives support for computing equipment over a management network from a support provider and the adverse event is regarding the computing equipment. The operations include analyzing the event communication received from the customer using natural language processing to identify a potential cause of the adverse event. The potential cause is related to the computing equipment. The operations include selecting one or more tests from a test library based on the identified potential cause of the adverse event. Each test of the one or more tests is configured to test a portion of the computing equipment to lead to identification of a cause of the adverse event. The operations include automatically initiating the selected one or more tests through the management network and analyzing test results from execution of the selected one or more tests to identify a cause the adverse event.

In some embodiments, the code is further configured to be executable by a processor to perform operations that include using a machine learning algorithm to correlate tests from the test library with adverse events from event communications, and training the machine learning algorithm using a plurality of event communications from one or more customers about adverse events, related identified potential causes of the adverse events from the event communications, configuration information about computing equipment of the one or more customers, selected tests for each identified potential cause, analysis from the test results, identified causes of the adverse events, and/or confirmed causes of the adverse events.

Figure 1:
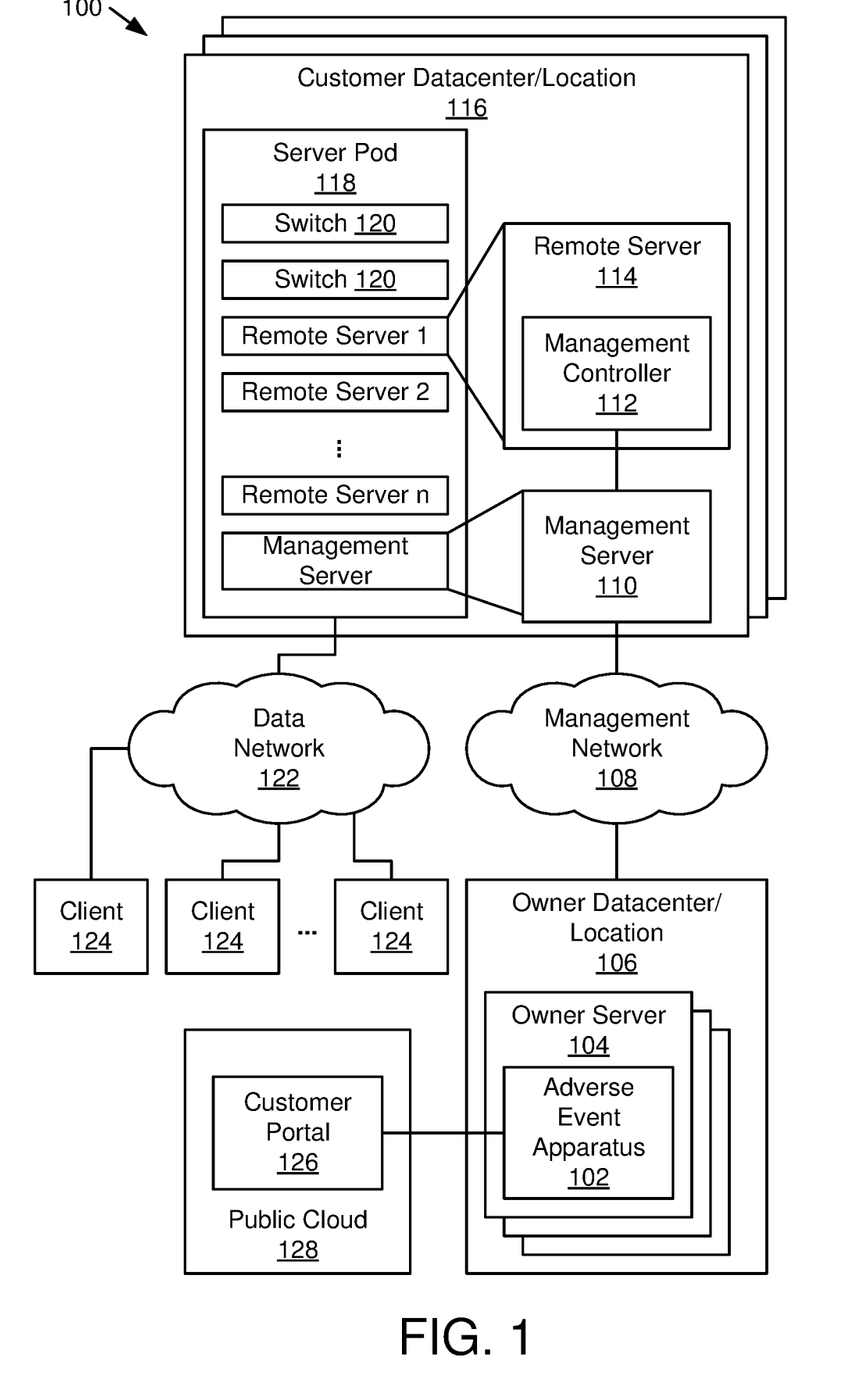
FIG. 1 is a schematic block diagram illustrating a system for dynamic test suite creation from event communications from customers, according to various embodiments.

FIG. 1 is a schematic block diagram illustrating a system 100 for dynamic test suite creation from event communications from customers, according to various embodiments. The system 100 includes an adverse event apparatus 102 in an owner server 104 at an owner location 106, a management network 108, a management server 110, remote servers 114, at a customer datacenter/location 116, each with a management controller 112, the remote servers 114 in a server pod 118 with switches 120, a data network 122 and clients 124, which are described below.

In various embodiments, a customer receives support for computing equipment from a support provider. In some embodiments, the support provider is an owner that owns the computing equipment, such as the remote servers 114, switches 120, the management server 110, etc. in a server pod 118 located in a customer datacenter 116 at a customer location 116. As used herein, the customer location 116 and customer datacenter 116 are used interchangeably. In some embodiments, the customer location 116 is a datacenter and in other embodiments, the customer location 116 is not a datacenter but includes computing equipment.

In some embodiments, the customer uses the computing equipment of the owner though a subscription. In other embodiments, the customer leases the computing equipment of the owner. In other embodiments, the computing equipment used by the customer is at the owner datacenter/location 106. As used herein, the owner datacenter 106 and the owner location 106 are used interchangeably recognizing that the owner server 104 may be in a datacenter or elsewhere at the owner location 106.

The computing equipment is often used by the customer to service workloads of clients 124 that access the remote servers 114 over a data network 122. In some embodiments, the remote servers 114 have one or more virtual machines ("VM") or containers associated with each client 124. A VM typically runs a separate instance of an operating system which provides separation from other clients 124 and provides a level of security for the clients 124. Containers do not have a separate instance of an operating system but still provide a level of security and independence from other clients 124.

The owner and/or support provider provide support for the computing equipment whether the computing equipment is at the customer location 116 or at the owner location 106. In some embodiments, the customer owns the computing equipment and the support provider provides support for the computing equipment. Providing support for the computing equipment includes managing the computing equipment by use of a management network 108 connected to a management server 110. The management server 110 is connected to a management controller 112 in each remote server 114, in switches 120, in storage devices (not shown), or other equipment of the computing equipment being supported. The management server 110 exchanges information with the management controllers 112 over the management network 108. While the management network 108 is depicted between the management server 110 and owner datacenter/location 106, the management network 108, in some embodiments, extends into the customer location 116 between the management server 110 and the various management controllers 112 in the computing equipment.

The management server 110 controls various aspects of the remote servers 114. In some examples, the management server 110 is a baseboard management controller ("BMC") or a controller that manages BMCs in the remote servers 114. The management server 110, in some embodiments, monitors internal physical variables in the remote servers 114, such as temperature, humidity, power supply voltage, fan speeds, communication parameters, operating system ("OS") functions, and the like. For example, the management server 110 may establish a VM, may allocate server resources to the VM, may initiate an OS instance in the VM, may route or assign jobs to the VM, etc. One of skill in the art will recognize other ways that a management server 110 functions with respect to the remote servers 114.

In one embodiment, the remote servers 114 each include a management controller 112 that measures and stores power consumption data of each remote server 114 and other computing equipment, monitors resources of the remote servers 114 and other computing equipment, controls startup and shutdown of the remote servers 114 as directed, and other management functions. In some examples, the management controller 112 is a BMC. In other embodiments, the management controller 112 is an XClarity® controller by Lenovo® or a controller with similar functionality. In some examples, the management controller 112 may measure CPU power, a memory power, graphical processor unit ("GPU"), fan power, and the like and stores the power consumption data. In other examples, the management controller 112 monitors operating systems, error logs, etc.

In other embodiments, the management controllers 112 of the computing equipment manage other functions of the remote servers 114 and/or other computing equipment. For example, the management controllers 112 may be used for access to the computing equipment when the computing equipment is powered off and may be used to reboot the computing equipment. In some embodiments, the management controllers 112 and/or management server 110 monitor communications, network connections, log files, and other information related to operation of the computing equipment.

In some embodiments, the management server 110 collects power consumption data, log files, performance data, and the like from each remote server 114 and transmits the data to the owner server 104 of an owner datacenter/location 106 over the management network 108 via a secure connection. The management network 108 is typically different from a data network 122 used to service workloads of the remote servers 114. In some embodiments, the management network 108 and data network 122 share a port of a network interface card. In other embodiments, the management server 110 and/or management controller 112 are connected to external connections through a separate port dedicated to the management network 108. The management server 110, in some embodiments, provides information about communications, operations, etc. related to both the management network 108 and the data network 122.

In some examples, the management server 110 includes a Lenovo® XClarity® Administrator ("LXCA"), Lenovo XClarity Orchestrator ("LXCO"), or similar controller that manages several remote servers 114 and associated management controllers 112. In some embodiments, the management server 110 periodically transmits power consumption data, log files, error messages, monitored parameter data, etc. to an owner server 104 in the owner datacenter/location 106 over the management network 108. For example, the management server 110 may transmit data to an owner server 104 of the owner on a daily basis, twice day or other data transmission rate.

In some embodiments, the management network 108 and/or the data network 122 is local area network ("LAN"), a wide area network ("WAN"), a fiber network, a wireless network, a cellular network, the Internet, etc. and may also include a combination of network types. The management network 108 and/or data network 122 includes data cables, servers, switches, routers, and/or other networking equipment.

The wireless connection may be a mobile telephone network. The wireless connection may also employ a Wi-Fi network based on any one of the Institute of Electrical and Electronics Engineers (IEEE) 802.11 standards. Alternatively, the wireless connection may be a BLUETOOTH® connection. In addition, the wireless connection may employ a Radio Frequency Identification (RFID) communication including RFID standards established by the International Organization for Standardization (ISO), the International Electrotechnical Commission (IEC), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

In some embodiments, the owner server 104 of the owner datacenter/location 106 processes power consumption data, utilization data, to create pricing information, which is sent to a customer portal 126 in a public cloud 128 for creation of a bill to be sent to the customer. In other embodiments, bills are created and sent from within the owner datacenter/location 106. In some embodiments, the customer portal 126 is a Lenovo TrueScale™ portal. In some embodiments, TrueScale is part of a pay-for-what-you-use datacenter technology that charges the customer based on actual use of the remote servers 114. In some embodiments, actual use is based on CPU utilization. For example, a lightly loaded remote server 114 may be charged less than a heavily loaded remote server 114.

Collecting power consumption data of a remote server 114 also provides information that can be used along with health alerts to predict server failures, which allows the owner to be prepared for an upcoming failure in a remote server 114. In some embodiments, the management controller 112 sends health alerts to the owner datacenter/location 106 for analysis and action. A health alert includes minor issues, such as an unexpected temperature rise, a memory fault, a reset of a component, an error message of a component, or other abnormal condition, and also includes failures, such as a failure of a CPU, a failure of a fan, a memory failure, etc.

Another way that the owner server 104 becomes aware of issues that affect the computing equipment used by the customer is to receive an event communication from the customer about some adverse event that is affecting the customer. Event communications are often valuable because of detail provided, context of the adverse event, identification of systems, software, workloads, etc. that are affected by the adverse event, and the like. In some embodiments, the adverse events provided by a customer includes information not available through the management network 108. The system 100 includes an adverse event apparatus 102 configured to dynamically create and run test suites from event communications from customers. While the adverse event apparatus 102 is depicted in the owner server 104, in other embodiments, the adverse event apparatus 102 is located elsewhere and has access to event communications from customers.

The adverse event apparatus 102 receives, via a management system, an event communication from a customer about an adverse event where the customer is receiving support for computing equipment over a management network from a support provider. The adverse event is about the computing equipment. The adverse event apparatus 102 analyzes the event communication using natural language processing to identify one or more potential causes of the adverse event where the potential cause is related to the computing equipment. The adverse event apparatus 102 selects one or more tests from a test library based on the identified potential cause of the adverse event and automatically initiates the selected tests over the management network 108 and then analyzes test results of the tests to identify a cause of the adverse event.

The adverse event apparatus 102 uses machine learning to correlate tests from the test library with adverse events from the event communications. In some embodiments, the adverse event apparatus 102 uses machine learning to correlate content of the event communications with adverse events from the event communications. The adverse event apparatus 102 uses machine learning to update the correlations based on continued reception of event communications, adverse events, identified potential causes, etc. The adverse event apparatus 102 is discussed in more detail with respect to the apparatuses 200, 300 of FIGS. 2 and 3.

Figure 2:
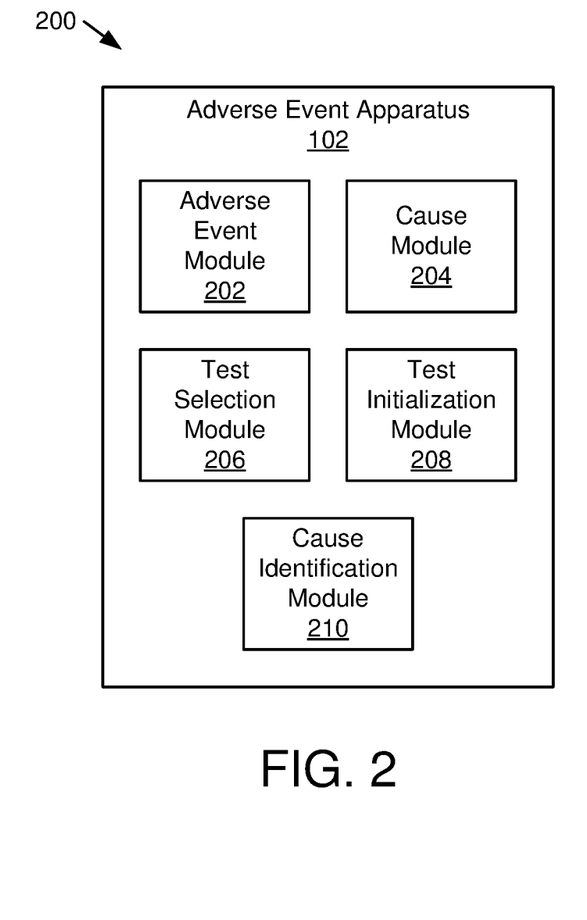
FIG. 2 is a schematic block diagram illustrating an apparatus for dynamic test suite creation from event communications from customers, according to various embodiments.

FIG. 2 is a schematic block diagram illustrating an apparatus 200 for dynamic test suite creation from event communications from customers, according to various embodiments. The apparatus 200 includes an adverse event apparatus 102 with an adverse event module 202, a cause module 204, a test selection module 206, a test initialization module 208, and a cause identification module 210, which are described below. In various embodiments, the apparatus 200 is implemented with code executable by a processor and stored on computer readable storage media. In some embodiments, all or a portion of the apparatus 200 is implemented using hardware circuits and/or a programmable hardware device.

The apparatus 200 includes an adverse event module 202 configured to receive, via a management system, an event communication from a customer about an adverse event. The customer is receiving support for computing equipment over a management network 108 from a support provider, which may be an owner. The adverse event is regarding the computing equipment. In some embodiments, the adverse event module 202 receives the event communication from a customer portal 126. The customer portal 126, in various embodiments, is used by the customer to access billing information, to view data related to the computing equipment, to manage allocations of resources, such as virtual central processing units ("vCPUs"), virtual memory, virtual data storage, and the like. Typically, customers are able to allocate vCPUs, virtual memory, and/or virtual data storage rather than physical CPUs, memory, and data storage because the physical CPUs, memory and/or data storage are oversubscribed. Customers typically access virtual resources, such as a virtual hard drive that are mapped to the physical resources.

The customers, in some embodiments, submit an event communication through the customer portal 126. In some embodiments, the event communication is via an adverse event form available through the customer portal 126 and the customer fills out and submits the form. In other embodiments, the adverse event module 202 receives an event communication as an electronic message such as an email, receives a recorded phone call, receives a video that includes audio information, pictures, etc. or by way of other communication technique.

In some embodiments, the adverse event module 202 transcribes the event communication to be in written form. The adverse event is some event that is adversely affecting the computing equipment used by the customers. In other embodiments, the adverse event may affect a remote server 114 or other portion of the computing equipment, may affect the management controllers 112 and/or management server 110, the management network 108, the data network 122, or any other equipment, software, etc. used by the customer. As an example, an adverse event may be a failed hard disk drive, malformed data packets transmitted through the data network 122 or management network 108, a failing processor, issues with billing or access to billing information, or other event adverse to the customer. One of skill in the art will recognize other adverse events.

The management system includes management controllers 112, management servers 110, the management network 108, the customer portal 126, and/or other portions of the system 100 used to manage the computing equipment and receive event communications. As mentioned above, the customer transmitting the event communication is receiving support for the computing equipment from a support provider. The support provider, in some embodiments, is an owner of all or a portion of the computing equipment. In other embodiments, the customer owns all or a portion of the computing equipment and may have a service contract with the support provider. The support provider provides support for the computing equipment over the management network 108. The computing equipment may be located remote from the support provider or may be located remote from the customer and may be collocated with resources of the support provider/owner. For example, the computing equipment may be part of a cloud computing solution used by a customer to provide workload execution for workloads of clients 124.

The apparatus 200 includes a cause module 204 configured to analyze the event communication received from the customer using natural language processing ("NLP") to identify a potential cause of the adverse event. The potential cause is related to the computing equipment. Adverse events, in some embodiments, are directly related to the potential cause. For example, an event communication may include an adverse event of an error message where the error message indicates a hard disk drive ("HDD") failure. The cause module 204 may use natural language processing, for example via a NLP engine, to read the event communication and identify a description of an error message that may include a code or other indicator of an HDD failure. The cause module 204 may then identify the potential cause as a failed or failing HDD.

In other embodiments, the adverse event is indirectly related to a potential cause. For example, the event communication may include a description such as trouble accessing a file, a frozen application, locked screen, etc. and the cause module 204 uses the NLP engine to read the event communication and identify language about the adverse event. In some embodiments, the cause module 204 maps various phrases with one or more potential causes. Where the adverse event is indirectly related to multiple potential causes, the cause module 204 identifies multiple potential causes.

The apparatus 200 includes a test selection module 206 configured to select one or more tests from a test library based on the identified potential cause of the adverse event. The one or more tests in the test library may be part of a test suite. The test suite may also include predefined test logic for execution of the tests in the test suite. For example, the test logic may execute the tests in a predefined order and may execute or ignore certain tests based on test results of one or more tests executed previously. For example, a test may be designed to determine if a potential cause was from a database. If test results from the test indicate that the database is functioning normally, the test logic may forgo other database testing. Where the test results indicate a problem with the database, the test logic may then select other database tests to further identify a cause of the adverse event.

Each test of the one or more tests is configured to test a portion of the computing equipment to lead to identification of a cause of the adverse event. In some examples, the tests are configured to test a component of the computing equipment, such as a CPU, an HDD, a network interface card ("NIC"), etc. In other examples, the tests are configured to test software of the computing equipment, such as a database, an application, an operating system component, etc. In other examples, the tests are configured to test communication pathways and systems, such the management network 108, the data network 122, communication errors, data packet integrity, and the like. In some embodiments, the test are qualification tests designed to test various parameters, metrics, etc. of operation of the computing equipment.

For example, the cause module 204 may identify a potential cause of a badly formed data packet coming from a remote server 114. The test selection module 206 may then select a test to determine if the badly formed data packet is coming over the data network 122 or the management network 108. The badly formed data packet may be caused by a database, a web server, a management controller 112, a management server 110, etc. The test selection module 206 may include tests for the database, the web server, the management controller 112, etc. and may include test logic to eliminate various components, systems, etc. as a potential cause based on test results.

In some embodiments, the cause module 204 identifies more than one potential cause and the test selection module 206 selects one or more tests or a test suite from the test library for each potential cause. In some embodiments, tests of the test library are grouped in test suites where a test suite is associated with one or more potential causes. The test selection module 206, in some embodiments, selects one or more test suites for each identified potential cause. One of skill in the art will recognize other ways for the test selection module 206 to select one or more tests from the test library based on the identified potential causes from the cause module 204.

The apparatus 200 includes a test initiation module 208 configured to automatically initiate the selected one or more tests through the management network 108. Automatically initiating the selected one or more tests includes initiating the selected tests without human action or direction. For example, the test initiation module 208 initiates the selected tests in response to the test selection module 206 selecting the tests rather than waiting for human intervention.

In some embodiments, the test initiation module 208 automatically initiates the selected tests through the owner server 104 by sending one or more instructions over the management network 108. In some embodiments, the management server 110 and/or the management controllers 112 run the tests initiated by the test initiation module 208. The management server 110 and/or management controllers 112, in some embodiments, pause execution of workloads, applications, etc. and otherwise prepare the computing equipment for running the selected tests. In some embodiments, the management server 110 and/or management controllers 112 resume operation of the computing equipment after running one or more tests. In other embodiments, the test initiation module 208 automatically initiates one or more selected tests at the owner location 106. In some embodiments, the test initiation module 208 initiates execution of tests of a test suite in a specified order.

The apparatus 200 includes a cause identification module 210 configured to analyze test results from execution of the selected one or more tests to identify a cause the adverse event. In some embodiments, the cause identification module 210 receives test results from the management server 110 over the management network 108. In some embodiments, the test initiation module 208 initiates the selected tests in a sequence and the cause identification module 210 analyzes test results to refine which of the selected tests are to be run or are to be run next. In some embodiments, the cause identification module 210 uses test logic of a test suite to identify a test sequence, to eliminate certain tests, etc. based on the test results. In some embodiments, the test selection module 206, the test initiation module 208, and the cause identification module 210 work together to run one or more tests, analyze test results, and then select and run additional tests to identify the cause of the adverse event. The test selection module 206, the test initiation module 208, and the cause identification module 210, in some embodiments, use test logic to select or eliminate tests, to sequence tests, etc. based on test results of one or more tests initiated by the test initiation module 208.

In some embodiments, the cause identification module 210 communicates the identified cause of the adverse event to a system administrator of the owner/service provider and/or the customer. In some embodiments, the cause identification module 210 is unsuccessful and the cause identification module 210 communicates failure to identify a cause to owner/service provider and/or the customer. In some embodiments, the cause identification module 210 initiates some other action in response to identifying a cause of the adverse event.

Beneficially, the adverse event apparatus 102 provides a mechanism to use a NLP engine on contents of an event communication to identify one or more potential causes of an adverse event of the event communication, and then to select one or more tests to identify a cause of the adverse event and then to automatically initiate selected tests and analyze the test results to identify a cause of the adverse event. The adverse event apparatus 102, in some embodiments, speeds identification of a cause of an adverse event to speed resolving the cause of the adverse event.

Figure 3:
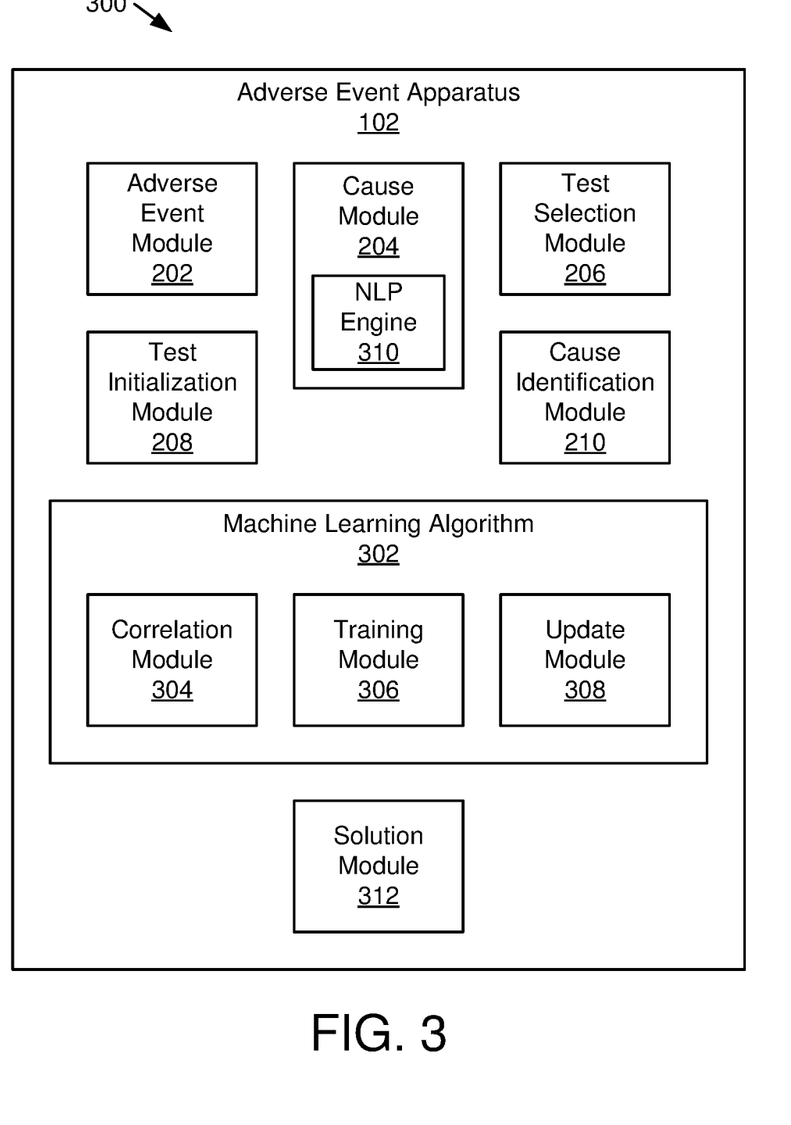
FIG. 3 is a schematic block diagram illustrating another apparatus for dynamic test suite creation from event communications from customers, according to various embodiments.

FIG. 3 is a schematic block diagram illustrating another apparatus 300 for dynamic test suite creation from event communications from customers, according to various embodiments. The apparatus 200 includes an adverse event apparatus 102 with an adverse event module 202, a cause module 204, a test selection module 206, a test initialization module 208, and a cause identification module 210, which are substantially similar to those described above in relation to the apparatus 200 of FIG. 2. The apparatus 200 includes, in various embodiments, a machine learning algorithm 302 with a correlation module 304, a training module 306, and/or an update module 308, an NLP engine 310 in the cause module 204, and/or a solution module 312, which are described below. In various embodiments, the apparatus 300 is implemented with code executable by a processor and stored on computer readable storage media. In some embodiments, all or a portion of the apparatus 300 is implemented using hardware circuits and/or a programmable hardware device.

In some embodiments, the apparatus 300 includes a machine learning algorithm 302 configured to refine which tests are selected for an adverse event, to correlate content of event communications with adverse events, and the like. In some embodiments, the machine learning algorithm 302 uses input from the adverse event apparatus 102, such as input from the adverse event module 202, the cause module 204, the test selection module 206, the test initialization module 208, and/or the cause identification module 210, to refine identifying causes of reported adverse events. The input, in some embodiments, includes a plurality of event communications from one or more customers about adverse events, related identified potential causes of the adverse events from the event communications, configuration information about computing equipment of the one or more customers, selected tests for each identified potential cause, analysis from the test results, identified causes of the adverse events, confirmed causes of the adverse events, and/or other input from the adverse event apparatus 102.

In some embodiments, the machine learning algorithm 302 includes a correlation module 304 configured to use machine learning to correlate tests from the test library with adverse events from event communications. In some examples, the correlation module 304 tracks various adverse events and associated potential causes along with the tests selected and initiated by the test selection module 206 and test initialization module 208. The correlation module 304, in some embodiments, tracks test results identifying actual causes of the adverse events to then change correlations between various tests of the test library with adverse events. In some embodiments, the correlation module 304 changes test logic of a test suite. In some embodiments, the correlation module 304 portion of the machine learning algorithm 302 identifies tests that do not contribute to identifying actual causes of adverse events and deletes the tests that do not contribute to identification of actual causes from a test suite for a related adverse event, by modifying test logic of a test suite. The correlation module 304, in some embodiments, adds tests identified as being useful in finding an actual cause of an adverse event to a test suite for an adverse event, for example, by modifying test logic of a test suite. Over time the correlation module 304 of the machine learning algorithm 302 increases effectiveness of the adverse event apparatus 102 in identifying causes of adverse events.

In some embodiments, the correlation module 304 of the machine learning algorithm 302 is configured to correlate adverse events with potential causes of the adverse events and updates the natural learning processing used to analyze event communications based on the correlation of adverse events with the potential causes. In some embodiments, the correlation module 304 compares adverse events with identified actual causes to update the correlation between adverse events and potential causes. In other embodiments, the correlation module 304 uses other input from the adverse event apparatus 102 to update the correlation between adverse events and potential causes.

For example, the adverse event may be a frozen screen while executing a particular application, which may be caused by a number of problems, such as a communication error, a frozen application, a virus, etc. The correlation module 304 compares various identified causes and adverse events and in time a pattern may be identified by the correlation module 304 linking a frozen screen to a bug in the application running when the screen froze. In other instances, the correlation module 304 may correlate a frozen screen to a failing graphics processing unit ("GPU"). In other embodiments, the correlation module 304 may link a frozen screen to a corrupted memory location. The correlation module 304, in some embodiments, correlates a frozen screen with a bug in an application, a failing GPU, a corrupted memory location and any other identified correlation and the test selection module 206 then selects tests configured to identify a bug in an application, to test a GPU, to test corrupted memory, etc.

In some embodiments, the correlation module 304 is configured to correlate content of event communications of customers with adverse events and updates natural language processing, for example by updating a NLP engine 310, of the event communications based on the correlation of the content of the event communications and the adverse events. Adverse events of event communications may be communicated in various forms and the correlation module 304 of the machine learning algorithm 302 uses various event communications and identified adverse events from the adverse event module 202 to train the machine learning algorithm 302 and update correlations between content of event communications with various adverse events. In some examples, the correlation module 304 identifies adverse events from content of event communications in various forms, phrasing, etc. and identified adverse events from the adverse event module 202 to update correlations between various content of event communications with adverse events and then the correlation module 304 modifies natural language processing used to analyze event communications accordingly.

In some embodiments, the machine learning algorithm 302 includes a training module 306 configured to train the machine learning algorithm 302 based on input from the adverse event apparatus 102 used for various event communications. In some embodiments, initially each potential cause of an adverse event has a default selection of tests (e.g. test suite) from the test library and the training module 306 of the machine learning algorithm 302 modifies the default selection of tests for one or more adverse events based on the training of the machine learning algorithm 302. In other embodiments, the machine learning algorithm 302 initially has other default settings, correlations, etc. and the training module 306 modifies the correlations, settings, etc. based on input from use of the adverse event apparatus 102 on event communications.

In some embodiments, the training module 306 is configured to train the machine learning algorithm 302 based on input from the adverse event apparatus 102 used for various event communications for a training period and modifies test logic, settings, etc. after the training period. In some embodiments, the training module 306 has a training period for each adverse event or each potential cause and modifies test logic, test settings, etc. for a particular adverse event or potential cause after the training period for the adverse event or potential cause.

In some embodiments, the machine learning algorithm 302 includes an update module 308 configured to further correlate content of additional event communications of customers with adverse events and to update natural language processing of the event communications based on the correlation of the content of the event communications and the adverse events. In other embodiments, the training module 306 is configured to update the correlations, settings, etc. of the adverse event apparatus 102 based on input from subsequent use of the adverse event apparatus 102 on event communications. Use of the machine learning algorithm 302 to analyze input of the adverse event apparatus 102 beneficially sharpens correlations between content of event communications and adverse events, correlations between adverse events and potential causes, tests within test suites for various potential causes, and the like.

In some embodiments, the cause module 204, includes an NLP engine 310 configured to do natural language processing of content of the event communications. The NLP engine 310 is customized to correlate contents of event communications with adverse events and to identify potential causes of the adverse events identified from the event communications. In some embodiments, the machine learning algorithm 302 modifies the NLP engine 310 to more effectively correlate contents of event communications with adverse events and to identify potential causes of the adverse events identified from the event communications.

The apparatus 300 includes, in some embodiments, a solution module 312 configured to automatically initiate a solution to an identified cause of the adverse event in response to the cause identification module 210 identifying a cause of the adverse event from the test results. For example, the identified cause may be a failed hard disk drive and the solution module 312 automatically initiates replacement of the hard disk drive. In some embodiments, the cause identification module 210 includes details with the identified cause, such as a location of the identified cause, a serial number of a component identified as causing the adverse event, etc. and the solution module 312 uses the details to automatically initiate a solution. In some embodiments, the solution module 312 transmits relevant information about the solution, such as a location, type of component to be replaced, version of software to be updated, etc.

For example, the identified cause may be a failed hard disk drive in a specific remote server 114 or other location and the solution module 312 automatically initiates replacement of the hard disk drive. Initiating replacement of the hard disk drive may include contacting an entity or person that replaces hard disk drives, transmitting information about a replacement HDD, such as capacity, speed, operating system, etc., transmitting information about where the failing HDD is located, and the like. In other examples, the identified cause of an adverse event may be software related and the solution module 312 automatically initiates installation of a patch, contacting the software provider, initiating a service tag, etc. to resolve the identified cause of the adverse event.

In other embodiments, the solution module 312 updates a service tag or other identification of the identified cause of the adverse event to close an action item, close a service tag, etc. once the solution module 312 successfully initiates the solution to the adverse event. In other embodiments, the solution module 312 monitors execution of the solution initiated by the solution module 312. One of skill in the art will recognize other ways for the solution module 312 to automatically initiate a solution, track execution of a solution, initiate additional steps of a solution, close out a service tag, etc. after the solution is executed, and the like.

Figure 4:
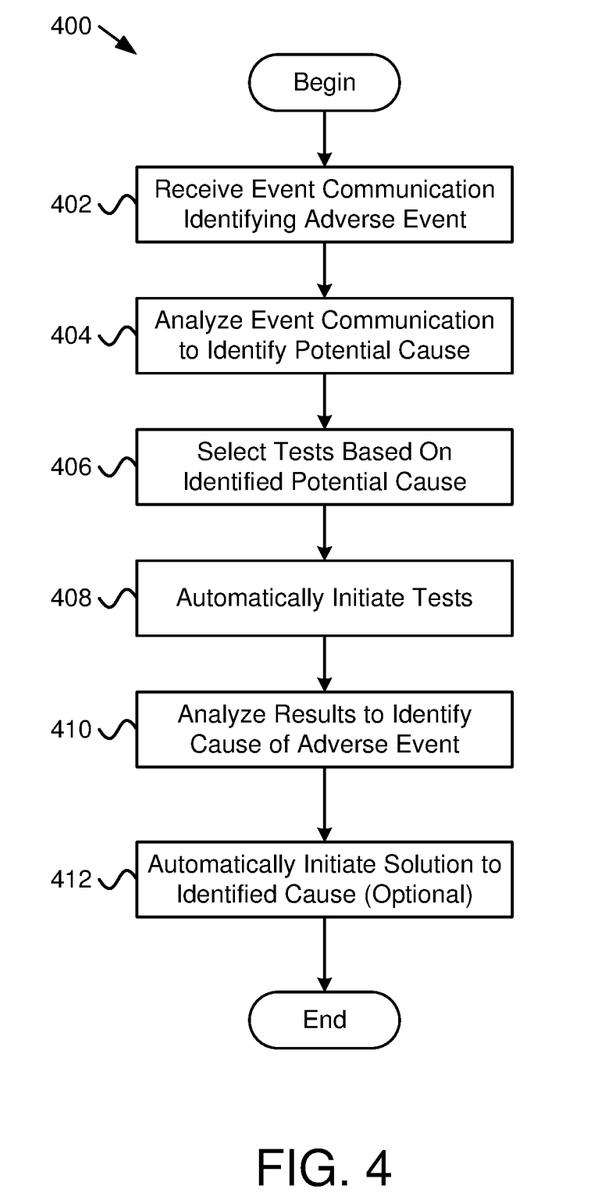
FIG. 4 is a schematic flow chart diagram illustrating a method for dynamic test suite creation from event communications from customers, according to various embodiments.

FIG. 4 is a schematic flow chart diagram illustrating a method 400 for dynamic test suite creation from event communications from customers, according to various embodiments. The method 400 begins and receives 402, via a management system, an event communication from a customer about an adverse event. The customer receives support for computing equipment over a management network 108 from a support provider and the adverse event is regarding the computing equipment. The method 400 analyzes 404 the event communication received from the customer using natural language processing to identify a potential cause of the adverse event. The potential cause is related to the computing equipment and selects 406 one or more tests from a test library based on the identified potential cause of the adverse event. Each test of the one or more tests is configured to test a portion of the computing equipment to lead to identification of a cause of the adverse event.

The method 400 automatically initiates 408 the selected one or more tests through the management network 108 and analyzes 410 test results from execution of the selected one or more tests to identify a cause the adverse event, and in some embodiments, the method 400 ends. In other embodiments, the method 400 automatically initiates 412 a solution to an identified cause of the adverse event in response to identifying a cause of the adverse event from the test results, and the method 400 ends. In various embodiments, all or a portion of the method 400 is implemented using the adverse event module 202, the cause module 204, the test selection module 206, the test initialization module 208, the cause identification module 210, and/or the solution module 312.

Figure 5:
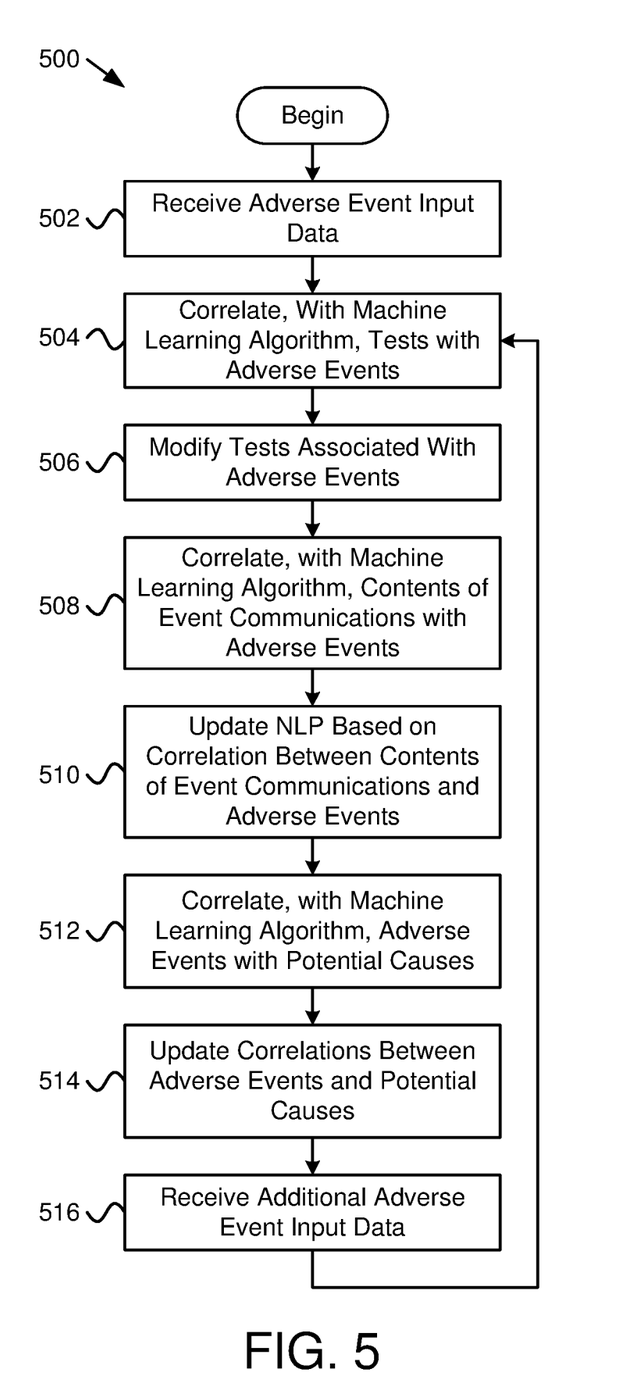
FIG. 5 is a schematic flow chart diagram illustrating another method for dynamic test suite creation from event communications from customers, according to various embodiments.

FIG. 5 is a schematic flow chart diagram illustrating another method 500 for dynamic test suite creation from event communications from customers, according to various embodiments. The method 500 begins and receives 502 adverse event input data. In some embodiments, the adverse event input data includes a plurality of event communications from one or more customers about adverse events, related identified potential causes of the adverse events from the event communications, configuration information about computing equipment of the one or more customers, selected tests for each identified potential cause, analysis from the test results, identified causes of the adverse events, and/or confirmed causes of the adverse events.

The method 500 correlates 504, using a machine learning algorithm 302, tests from a test library with adverse events from event communications and modifies 506 tests associated with the adverse tests. In some embodiments, the method 500 modifying 506 tests includes changing which tests are in a test suite correlated with a potential cause and/or changing test logic of a test suite. The method 500 correlates 508, using the machine learning algorithm 302, content of event communications of customers with adverse events and updates 510 natural language processing of the event communications based on the correlation of the content of the event communications and the adverse events. In some embodiments, the method 500 correlates 512 adverse events with potential causes of the adverse events and updates 514 the correlations between adverse events and potential causes. For example, the method 500 may correlate 512 a particular adverse event with a potential cause that was not previously associated with the potential cause and may then update 514 a correlation or mapping of adverse events to potential causes.

The method 500 receives 516 additional adverse event data and returns and correlates 504 tests with adverse events, correlates 508 contents of event communications with adverse events, etc. In various embodiments, all or a portion of the method 500 is implemented using the adverse event module 202, the cause module 204, the test selection module 206, the test initialization module 208, the cause identification module 210, a machine learning algorithm 302 with a correlation module 304, a training module 306, and/or an update module 308, a NLP engine 310 in the cause module 204, and/or the solution module 312.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   receiving, via a management system, an event communication from a customer about an adverse event, the customer receiving support for computing equipment over a management network from a support provider, the adverse event regarding one or more computing devices of the computing equipment, the management network comprising a computer network connected to computing devices of the computer equipment via a management controller in each of the computing devices, wherein the support provider communicates with the computing devices over the management network;
   analyzing the event communication received from the customer using natural language processing to identify a potential cause of the adverse event, the potential cause related to the computing equipment;
   selecting one or more tests from a test library based on the identified potential cause of the adverse event, each test of the one or more tests is configured to test a portion of the computing equipment to lead to identification of a cause of the adverse event;
   automatically initiating the selected one or more tests through the management network by transmitting code comprising the one or more tests via the management controller, the code executable by the computing devices and/or the management controllers;
   analyzing test results from execution of the selected one or more tests to identify a cause the adverse event;
   using a machine learning algorithm to correlate tests from the test library with adverse events from event communications; and
   training the machine learning algorithm using:
      a plurality of event communications from one or more customers about adverse events;
      related identified potential causes of the adverse events from the event communications;
      configuration information about computing equipment of the one or more customers;
      selected tests for each identified potential cause;
      analysis from the test results;
      identified causes of the adverse events; and/or
      confirmed causes of the adverse events.

2. The method of claim 1, wherein each potential cause of an adverse event comprises a default selection of tests and the machine learning algorithm modifies the default selection of tests for one or more adverse events based on the training of the machine learning algorithm.

3. The method of claim 1, wherein the machine learning algorithm updates the correlation between the tests from the test library and adverse events based on input from additional adverse events from event communications.

4. The method of claim 1, wherein the machine learning algorithm further correlates content of event communications of customers with adverse events and updates natural language processing of the event communications based on the correlation of the content of the event communications and the adverse events.

5. The method of claim 1, wherein the machine learning algorithm further correlates adverse events with potential causes of the adverse events and updates the natural learning processing used to analyze event communications based on the correlation of adverse events with the potential causes.

6. The method of claim 1, further comprising automatically initiating a solution to an identified cause of the adverse event in response to identifying a cause of the adverse event from the test results, wherein initiating the solution comprises transmitting code via the management network to the computing devices via the management controllers.

7. The method of claim 1, wherein the customer leases the computing equipment from the support provider and/or has a subscription for use of the computing equipment.

8. The method of claim 1, wherein the computing equipment is at a customer location remote from a location of a server of the support provider and the support provider manages the computing equipment over the management network, the server of the support provider comprising a portion of the management system.

9. The method of claim 1, wherein the event communication is received via an electronic message, a recorded phone call, and/or a recorded online meeting.

10. An apparatus comprising:
    a processor; and
    non-transitory computer readable storage media storing code, the code being executable by the processor to perform operations comprising:
       receiving, via a management system, an event communication from a customer about an adverse event, the customer receiving support for computing equipment over a management network from a support provider, the adverse event regarding one or more computing devices of the computing equipment, the management network comprising a computer network connected to computing devices of the computer equipment via a management controller in each of the computing devices, wherein the support provider communicates with the computing devices over the management network;

analyzing the event communication received from the customer using natural language processing to identify a potential cause of the adverse event, the potential cause related to the computing equipment;

selecting one or more tests from a test library based on the identified potential cause of the adverse event, each test of the one or more tests is configured to test a portion of the computing equipment to lead to identification of a cause of the adverse event;

automatically initiating the selected one or more tests through the management network by transmitting code comprising the one or more tests via the management controller, the code executable by the computing devices and/or the management controllers;

analyzing test results from execution of the selected one or more tests to identify a cause the adverse event;

using a machine learning algorithm to correlate tests from the test library with adverse events from event communications;

training the machine learning algorithm using:
  a plurality of event communications from one or more customers about adverse events;
  related identified potential causes of the adverse events from the event communications;
  configuration information about computing equipment of the one or more customers;
  selected tests for each identified potential cause;
  analysis from the test results;
  identified causes of the adverse events; and/or
  confirmed causes of the adverse events.

11. The apparatus of claim 10, wherein each potential cause of an adverse event comprises a default selection of tests and the machine learning algorithm modifies the default selection of tests for one or more adverse events based on the training of the machine learning algorithm.

12. The apparatus of claim 10, wherein the machine learning algorithm updates the correlation between the tests from the test library and adverse events based on input from additional adverse events from event communications.

13. The apparatus of claim 10, wherein the machine learning algorithm further correlates:
  content of event communications of customers with adverse events and updates natural language processing of the event communications based on the correlation of the content of the event communications and the adverse event; and/or
  adverse events with potential causes of the adverse events.

14. The apparatus of claim 10, the operations further comprise automatically initiating a solution to an identified cause of the adverse event in response to identifying a cause of the adverse event from the test results.

15. A program product comprising a non-transitory computer readable storage medium storing code, the code being configured to be executable by a processor to perform operations comprising:

receiving, via a management system, an event communication from a customer about an adverse event, the customer receiving support for computing equipment over a management network from a support provider, the adverse event regarding one or more computing devices of the computing equipment, the management network comprising a computer network connected to computing devices of the computer equipment via a management controller in each of the computing devices, wherein the support provider communicates with the computing devices over the management network;

analyzing the event communication received from the customer using natural language processing to identify a potential cause of the adverse event, the potential cause related to the computing equipment;

selecting one or more tests from a test library based on the identified potential cause of the adverse event, each test of the one or more tests is configured to test a portion of the computing equipment to lead to identification of a cause of the adverse event;

automatically initiating the selected one or more tests through the management network by transmitting code comprising the one or more tests via the management controller, the code executable by the computing devices and/or the management controllers;

analyzing test results from execution of the selected one or more tests to identify a cause the adverse event;

using a machine learning algorithm to correlate tests from the test library with adverse events from event communications;

training the machine learning algorithm using:
  a plurality of event communications from one or more customers about adverse events;
  related identified potential causes of the adverse events from the event communications;
  configuration information about computing equipment of the one or more customers;
  selected tests for each identified potential cause;
  analysis from the test results;
  identified causes of the adverse events; and/or
  confirmed causes of the adverse events.

* * * * *